United States Patent
Yang et al.

(12)

(10) Patent No.: US 7,278,679 B2
(45) Date of Patent: Oct. 9, 2007

(54) AUTOMOTIVE VEHICLE WITH STRUCTURAL PANEL HAVING SELECTIVELY DEPLOYABLE SHAPE MEMORY ALLOY ELEMENTS

(75) Inventors: Ren-Jye Yang, Troy, MI (US); Jerry Jialiang Le, Canton, MI (US); Clifford Chou, Farmington Hills, MI (US); Hom-Sen Tzou, Lexington, KY (US)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 11/163,649

(22) Filed: Oct. 26, 2005

(65) Prior Publication Data

US 2007/0090667 A1    Apr. 26, 2007

(51) Int. Cl.
*B13R 13/04* (2006.01)
(52) U.S. Cl. .................... 296/191; 296/187.09
(58) Field of Classification Search ........... 296/191, 296/187.02, 210, 193.11, 193.12
See application file for complete search history.

(56) References Cited

U.S. PATENT DOCUMENTS

| | | | | |
|---|---|---|---|---|
| 3,816,774 | A * | 6/1974 | Ohnuki et al. ............ 310/332 |
| 4,089,927 | A * | 5/1978 | Taylor ..................... 310/331 |
| 5,558,304 | A * | 9/1996 | Adams ..................... 244/134 A |
| 5,619,177 | A * | 4/1997 | Johnson et al. ............ 337/140 |
| 5,632,841 | A * | 5/1997 | Hellbaum et al. ......... 156/245 |
| 5,662,294 | A * | 9/1997 | Maclean et al. ........... 244/219 |
| 5,899,818 | A  | 5/1999 | Zider et al. |
| 6,060,811 | A * | 5/2000 | Fox et al. ................. 310/311 |
| 6,086,097 | A  | 7/2000 | Van Wynsberghe |
| 6,193,303 | B1 | 2/2001 | Urushiyama et al. |
| 6,220,550 | B1 * | 4/2001 | McKillip, Jr. ............ 244/215 |
| 6,286,895 | B1 * | 9/2001 | Urushiyama et al. .. 296/187.03 |
| 6,409,749 | B1 * | 6/2002 | Maynard .................. 623/1.1 |
| 6,491,291 | B1 | 12/2002 | Keeney et al. |
| 6,543,110 | B1 * | 4/2003 | Pelrine et al. ............ 29/25.35 |
| 6,626,486 | B2 | 9/2003 | Lane |
| 6,833,656 | B2 * | 12/2004 | Hooley et al. ............ 310/369 |
| 6,863,242 | B2 * | 3/2005 | Van De Kreeke et al. .. 244/7 R |
| 7,063,377 | B2 * | 6/2006 | Brei et al. ............ 296/187.09 |
| 7,090,288 | B2 * | 8/2006 | Suzuki et al. ......... 296/187.09 |
| 2004/0197519 | A1 * | 10/2004 | Elzey et al. ................ 428/68 |
| 2004/0217627 | A1 | 11/2004 | Mae |

* cited by examiner

*Primary Examiner*—Kiran B. Patel
(74) *Attorney, Agent, or Firm*—Gigette M. Bejin; Dickinson Wright PLLC

(57) ABSTRACT

A structural panel for an automotive vehicle includes an outer panel and a variable strength inner panel attached to the outer panel. The inner panel utilizes active elements formed from shape memory alloy (SMA). A controller activates the SMA elements so as to transform the inner panel from a normal state to a higher strength state in the event of an impact directed against a vehicle.

9 Claims, 5 Drawing Sheets

AUTOMOTIVE VEHICLE WITH STRUCTURAL PANEL HAVING SELECTIVELY DEPLOYABLE SHAPE MEMORY ALLOY ELEMENTS

TECHNICAL FIELD

The present invention relates to an automotive exterior panel having triggerable strength enhancers employing shape memory alloy (SMA) elements which may be deployed in the event of an impact against the vehicle.

BACKGROUND

Automotive designers have increasingly turned to impact-responsive devices to protect occupants against the effects of an impact event directed against a vehicle. Responsive devices first included such mechanisms as inertia responsive seatbelt reels, and later, inflatable side curtain airbags to supplement airbags mounted within the instrument panel and steering wheel. In the event of an impact directed against an upper surface of a vehicle such as the vehicle's top, or in the case of a pedestrian accident, the vehicle's hood, it is desirable to provide additional strength to these panels. In the case of the vehicle top, additional strength will assist in mitigating crushing of the top; in the case of an engine compartment hood, additional strength will mitigate strikethrough of the hood to the much more rigid engine of the vehicle.

The present invention provides structures which may be employed to selectively increase the strength of a vehicle's top or engine compartment hood, or other panels, in the event of an impact event directed against a vehicle.

SUMMARY

A structural panel for an automotive vehicle includes an outer panel and a variable strength inner panel attached to the outer panel. The inner panel includes a number of active elements formed from shape memory alloy ("SMA"). A controller activates the SMA active elements so as to transform the inner panel from a normal state to a higher strength state.

In one embodiment according to the present invention, the inner panel also includes a flexible substrate suspended by active SMA elements. The substrate may include a woven matrix comprised of active elements, or a non-active woven matrix.

A controller employed in the present system operates the active elements by supplying an electric current to the elements. The current is of sufficient magnitude to cause the active elements to transform from martensite to austenite.

In one embodiment of the present invention, a structural panel has an inner panel with a flexible substrate suspended by active SMA elements. The inner panel is mounted within a central region of an engine compartment hood. A controller operates the SMA elements such that in the event of an impact directed against a frontal region of the vehicle, the active SMA elements will be caused to tension the flexible substrate to resist vertical strikethrough of the hood to an engine located within the engine compartment. In this case, the controller preferably operates the active SMA elements such that the active elements are strengthened according to a time-based function following an impact directed against the hood.

According to another aspect of the present invention, an inner panel includes a woven metallic matrix suspended by active SMA elements, with the inner panel having a number of elastomeric dampers located at the interstices of the matrix. The woven metallic matrix and the isolators may be configured such that the modulus of elasticity of the metallic matrix will be at a lower value characterized by compression of the isolators during initial deformation of the matrix, and at a higher value, characterized by solid contact of the metallic matrix components during more extensive deformation of the structural panel.

According to another aspect of the present invention, the inner panel may further include a fabric matrix suspended by SMA active elements.

According to another aspect of the present invention, a method for dynamically increasing the strength of a structural panel installed in an automotive vehicle includes the steps of sensing an impact directed against a vehicle and directing a current through at least one SMA active element operatively associated with an inner panel mounted at an interior portion of the structural panel, so as to increase the strength of the inner panel. This method may further include the step of regulating the magnitude of the current according to the magnitude of the impact.

It is an advantage of a system and method according to the present invention that components may be strengthened during an impact event without adding the burden of increased weight and structural complexity.

It is a further advantage of a system and method according to the present invention that selective strengthening may be provided in structural panels, such as an engine compartment hood, for which conventional strengthening methods and structures may not operate satisfactorily.

Other advantages, as well as objects and features of the present invention will become apparent to the reader of this specification.

DETAILED DESCRIPTION OF THE PREFERRED EMBODIMENTS

Figure 1:
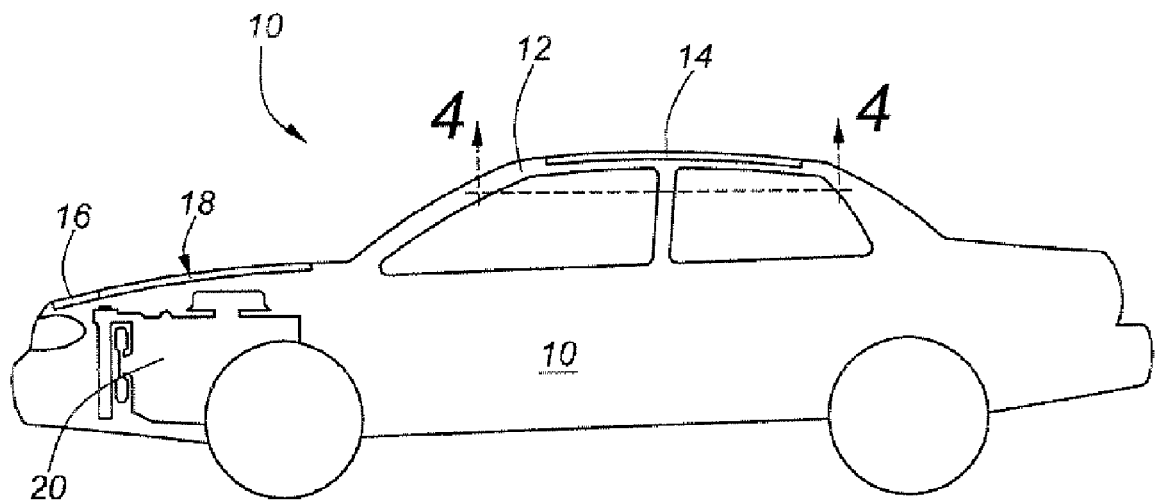
FIG. 1 is a schematic representation of a vehicle having structural panels containing SMA active elements.

As shown in FIG. 1, vehicle 10 has a roof outer panel, 12, and an inner panel, 14, containing shape memory alloy (SMA) active elements. Vehicle 10 also includes a hood having outer panel 16 and an inner panel 18, which also contains active SMA elements. Vehicle 10 further includes engine 20.

Figure 2:
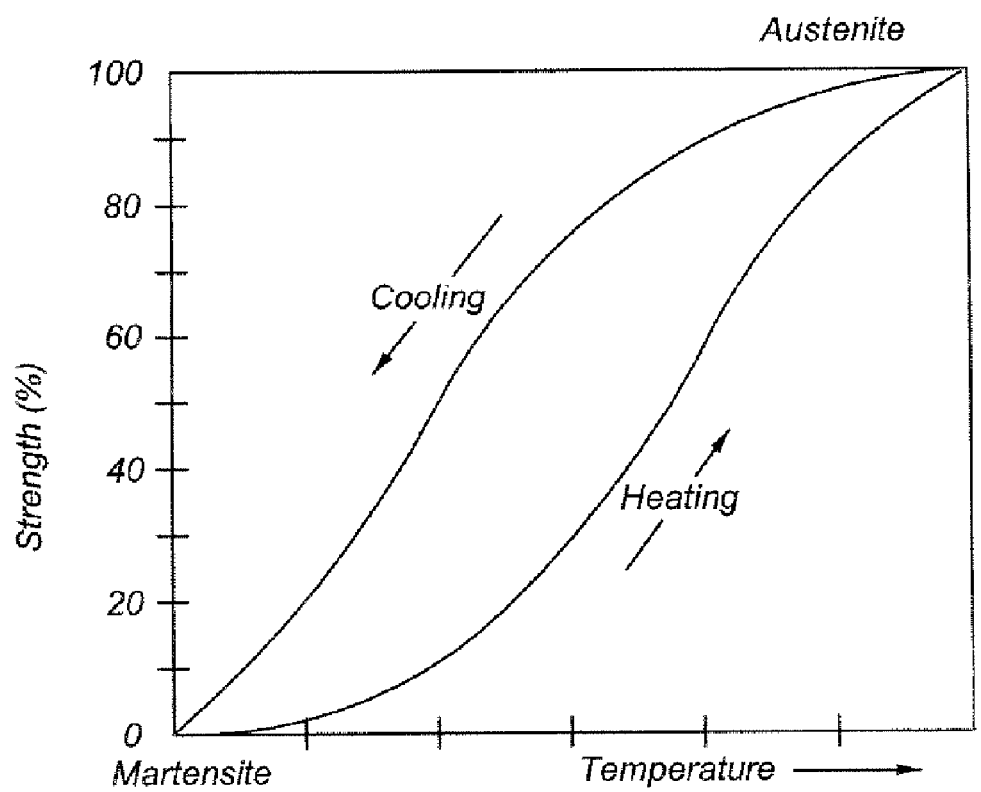
FIG. 2 is a plot showing the strength characteristics of a typical SMA.

Known SMAs typically include NiTi (nickel-titanium), as well as CuZnAl and CuAlNi. FIG. 2 illustrates an SMA response curve showing that the material changes from martensite to austenite, with a concomitant increase in strength approaching 100 percent, as the temperature is increased. Self-heating, caused by passing a current through the SMA wire, may be used to achieve the temperature rise required to achieve this increase in strength.

Figure 3:
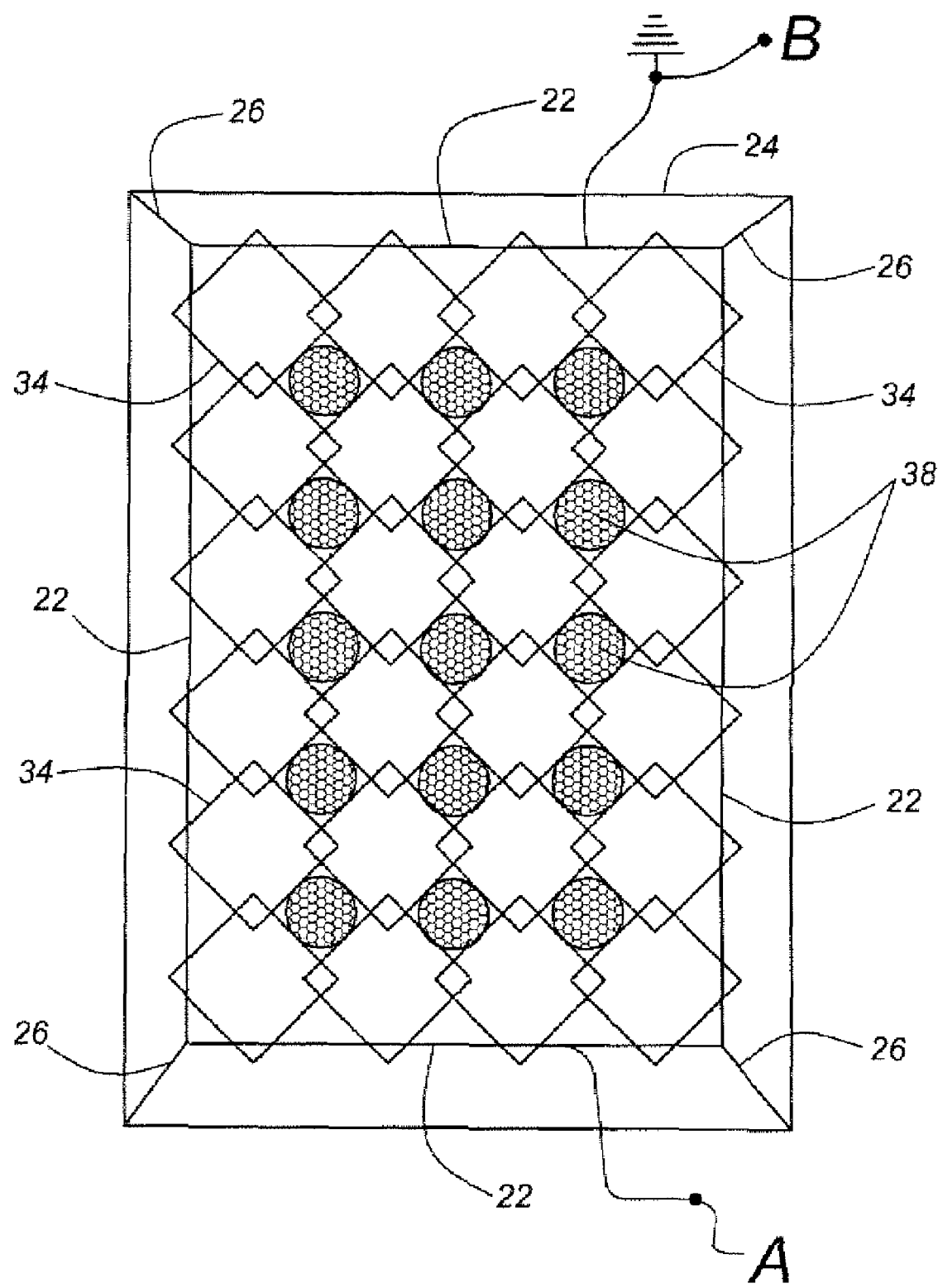
FIG. 3 is a schematic representation of a portion of an inner panel having SMA active elements combined with a non-active mesh portion having elastomeric isolators.

FIG. 3 illustrates a first generalized type of composite inner panel construction according to the present invention in which SMA active elements, 22, are combined with a non-active metallic mesh 34. A number of isolators, 38, are positioned at interstices of metallic mesh or matrix 34. Metallic mesh 34 and SMA elements 22 are suspended within a non-conductive carrier, 24, by means of diagonal links 26. When a current is passed across terminals A and B, SMA active elements 22 will undergo the previously described transformation from martensite to austenite, and this will cause the metallic mesh 34 to be rigidly suspended, so as to be better able to withstand an impact directed against mesh 34, which is intended to be incorporated within an inner panel. When a vehicle having the SMA-activated panel shown in FIG. 3 is under normal operation, such that SMA elements 22 are in their martensite or soft, state, the combination of the SMA elements in the martensite state and isolators 38 will effectively damp vibration and noise which would otherwise arise from the composite inner panel.

In essence, woven metallic matrix 34 and isolators 38 are configured such that the modulus of elasticity of matrix 34 will be at a lower value, characterized by compression of isolators 38 during initial deformation of matrix 34, and at a higher value, characterized by solid contact of the metallic matrix components, during more extensive deformation of the structural panel.

Figure 4:
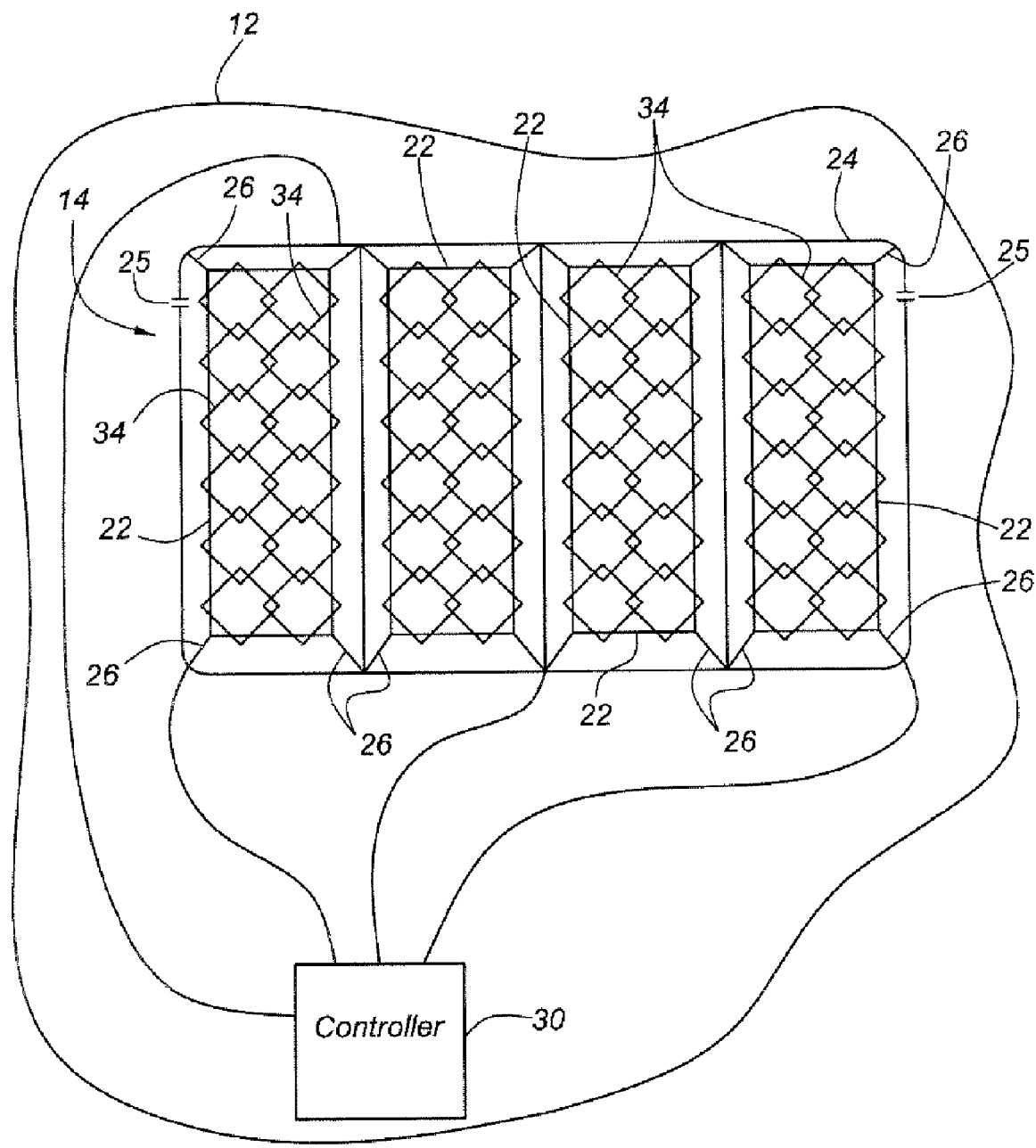
FIG. 4 is a schematic representation of a vehicle inner panel having four separate segments with strength enhancing SMA elements. This view is directed upwardly at a roof interior panel, and is taken in the plan direction 4-4 of FIG. 1.

FIG. 4 illustrates an inner panel, 14, for a vehicle roof, in which four separate sets of SMA active elements are used to suspend metallic mesh elements 34. The metallic mesh elements 34 are suspended by active SMA elements 22, which are in turn attached by means of diagonal links 26 to carrier 24. Carrier 24 is itself anchored to outer panel 12. In this embodiment, carrier 24 also serves as a conductive bus, which allows controller 30 to pass a current through SMA elements 22. Thus, carrier 24 has dielectric breaks at locations 25. In the event that an impact against vehicle 10 is sensed, either through precrash sensing or sensing employed for a supplemental restraint system of the types known to those skilled in the art and suggested by this disclosure, controller 30 will pass a current through SMA active elements 22, thereby providing a very much strengthened—by a factor of four times—mounting for metallic matrices 34, so as to strengthen inner roof panel 14 and outer panel 12.

Figure 5:
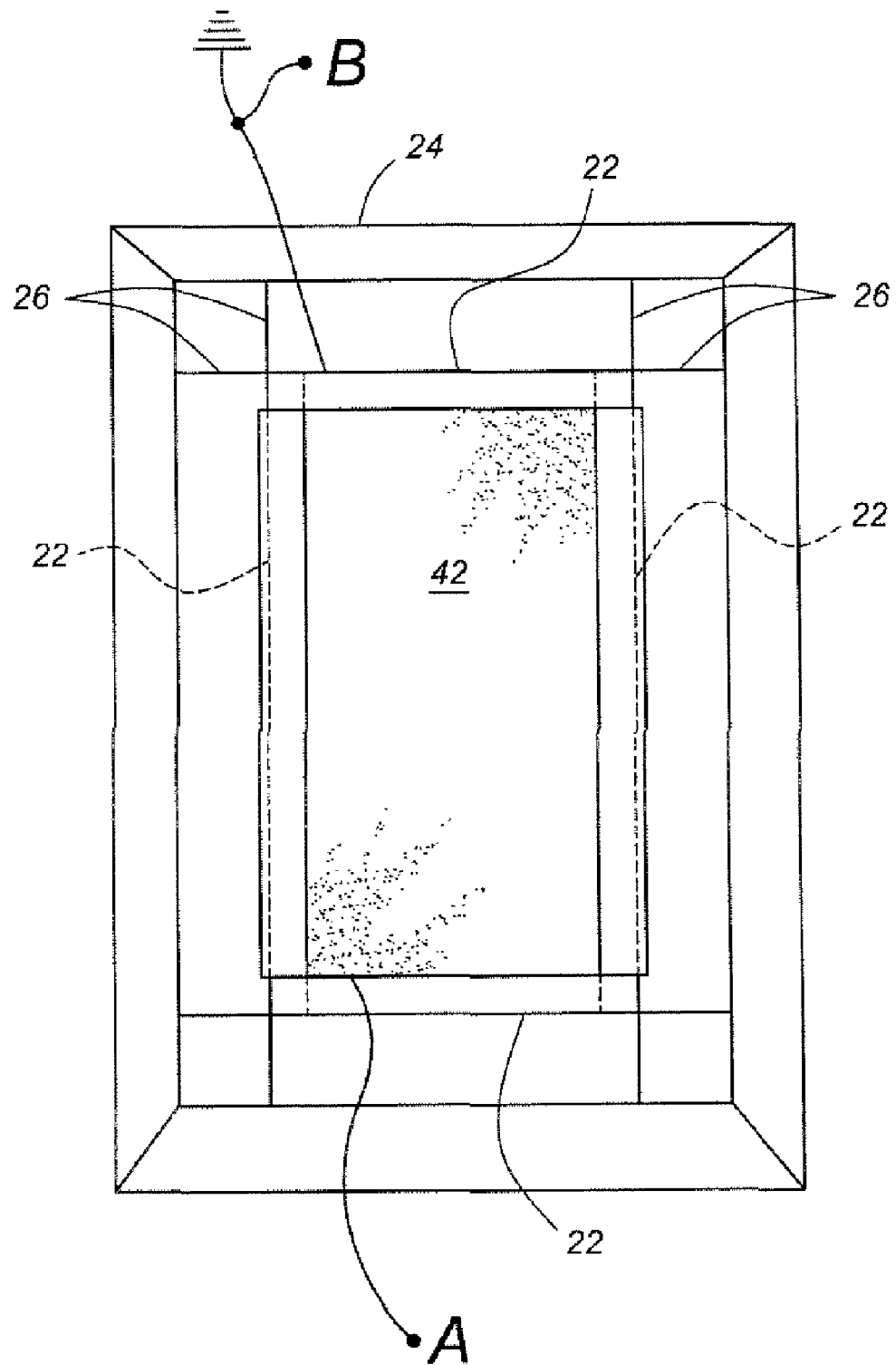
FIG. 5 illustrates an embodiment in which a fabric matrix is combined with SMA active elements.

FIG. 5 illustrates a fabric matrix, 42, which is suspended by SMA elements 22 within a non-conductive carrier 24 by means of diagonal links 26, which are also non-conductive. As before, a current is supplied to terminals A and B to achieve the transformation of the SMA elements from martensite to austenite. Fabric matrix 42 may be formed from high strength heat-resistant fabric such as automotive airbag fabric or other fabrics known to those skilled in the art and suggested by this disclosure.

Figure 6:
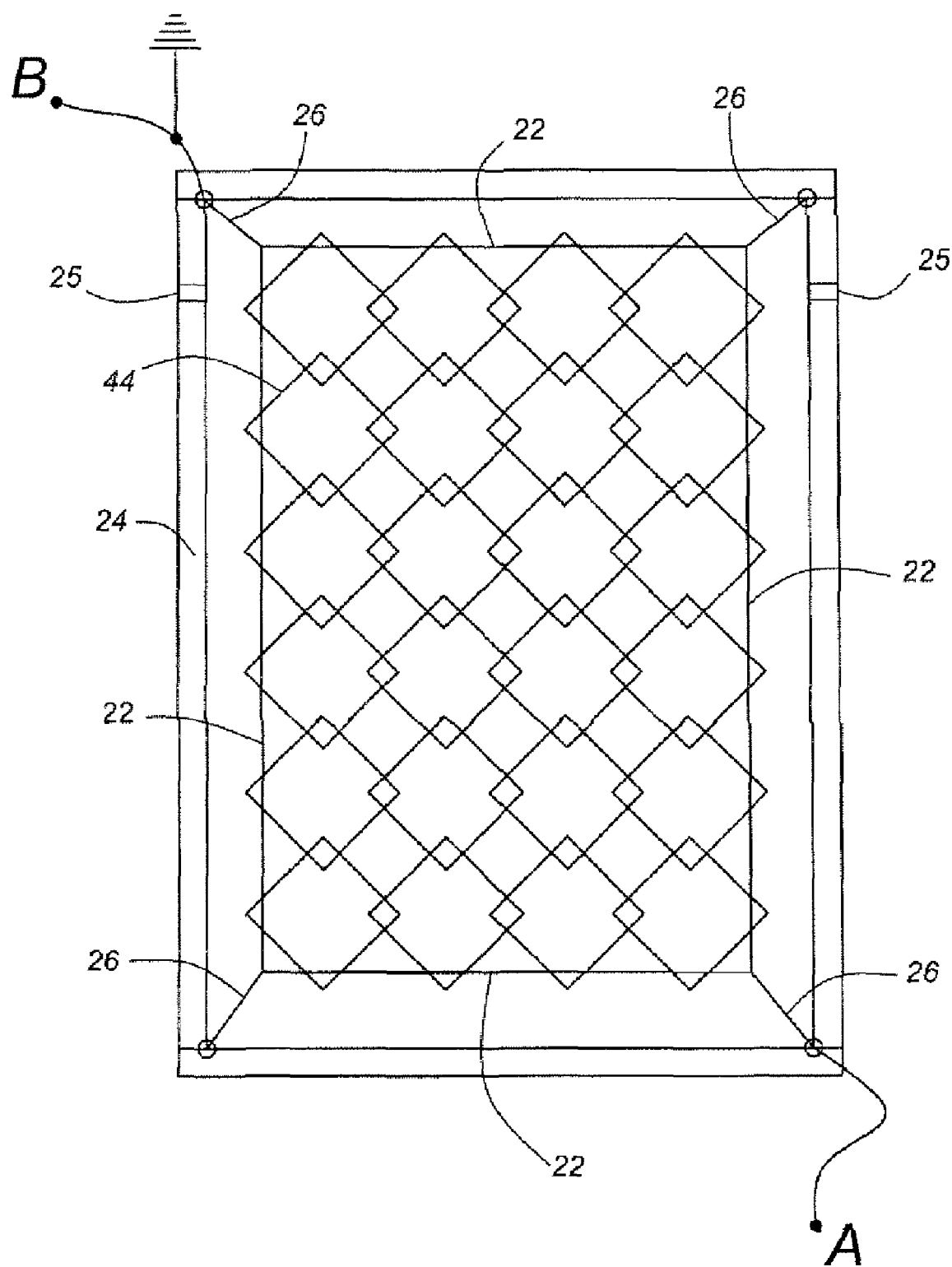
FIG. 6 illustrates an inner panel in which a central matrix is comprised entirely of SMA active elements.

FIG. 6 is similar to FIG. 4, but matrix 44 comprises an SMA mesh. Thus, when voltage is applied across terminals A and B, a current will flow through the entirety of elements 22 and SMA mesh 44, resulting in a large increase of the strength of the mesh 44 itself.

When SMA-enhanced panel 18 is incorporated in engine compartment hood 16, controller 30 may furnish SMA elements 20 with a variable current such that the strength of elements 20 is ramped from a lower value to a higher value as a function of time following an impact event. Ramping may also be employed with a system incorporated in a vehicle roof. In the case of hood 16, ramping may be scheduled to mitigate the effects of a pedestrian striking hood 16, so as to avoid strikethrough to engine 20.

While particular embodiments of the invention have been shown and described, numerous variations and alternate embodiments will occur to those skilled in the art. Accordingly, it is intended that the invention be limited only in terms of the appended claims.

What is claimed is:

1. A structural panel for an automotive vehicle, comprising:
   an outer panel;
   a variable strength inner panel attached to said outer panel, with said inner panel comprising a plurality of active elements formed from a shape memory alloy and a flexible substrate comprising a woven metallic matrix suspended by said active elements; and
   a controller for activating said active elements so as to transform the inner panel from a normal state to a higher strength state.

2. A structural panel according to claim 1, wherein said structural panel comprises a roof panel.

3. A structural panel according to claim 1, wherein said controller activates said active elements by supplying an electric current to said elements, with said current being of sufficient magnitude to cause the active elements to transform from martensite to austenite.

4. A structural panel according to claim 1, wherein said structural panel comprises an engine compartment hood.

5. A structural panel according to claim 4, wherein said inner panel comprises a flexible substrate suspended by the active elements within a central region of said engine compartment hood, with said controller operating the active elements such that in the event of an impact directed against a frontal region of the hood, the active elements will be caused to tension the flexible substrate to resist vertical strikethrough of the hood to an engine located within the engine compartment.

6. A structural panel according to claim 5, wherein said controller operates the active elements such that the active elements are strengthened according to a time-based function following an impact directed vertically against the hood.

7. A structural panel according to claim 1, wherein said inner panel further comprises a plurality of elastomeric dampers located at the interstices of the matrix.

8. A structural panel according to claim 7, wherein said woven metallic matrix and said isolators are configured such that the modulus of elasticity of the metallic matrix will be at a lower value characterized by compression of said isolators during initial deformation of the matrix and at a higher value characterized by solid contact of the metallic matrix components during more extensive deformation of the structural panel.

9. A structural panel according to claim 7, wherein said woven metallic matrix and said isolators are configured such that the modulus of elasticity of the metallic matrix will be at a lower value during initial deformation of the matrix and at a higher value during more extensive deformation of the structural panel.

* * * * *